US010755335B2

(12) United States Patent
Sonoda et al.

(10) Patent No.: US 10,755,335 B2
(45) Date of Patent: Aug. 25, 2020

(54) RECORDING MEDIUM, PRODUCT RECOMMENDATION SYSTEM, AND PRODUCT RECOMMENDATION METHOD

(71) Applicant: FUJI XEROX CO., LTD., Tokyo (JP)

(72) Inventors: Takashi Sonoda, Yokohama (JP); Hidetaka Izumo, Yokohama (JP); Masahiro Sato, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 759 days.

(21) Appl. No.: 15/347,287

(22) Filed: Nov. 9, 2016

(65) Prior Publication Data

US 2017/0337613 A1    Nov. 23, 2017

(30) Foreign Application Priority Data

May 23, 2016    (JP) .................................. 2016-102236

(51) Int. Cl.
*G06Q 30/00*        (2012.01)
*G06Q 30/06*        (2012.01)
*G06Q 30/02*        (2012.01)

(52) U.S. Cl.
CPC ..... *G06Q 30/0631* (2013.01); *G06Q 30/0282* (2013.01)

(58) Field of Classification Search
CPC ............... G06Q 30/00; G06Q 30/0601; G06Q 30/0623; G06Q 30/0631
See application file for complete search history.

(56) References Cited

U.S. PATENT DOCUMENTS

| 2002/0026390 A1* | 2/2002 | Ulenas | G06Q 30/0201 705/26.1 |
| 2003/0105682 A1* | 6/2003 | Dicker | G06Q 30/0633 705/26.8 |
| 2005/0097005 A1* | 5/2005 | Fargo | G06Q 30/0625 705/26.62 |
| 2008/0308630 A1* | 12/2008 | Bhogal | G07G 1/0081 235/383 |
| 2010/0023340 A1* | 1/2010 | Chowdhary | G06Q 30/0631 705/1.1 |

(Continued)

FOREIGN PATENT DOCUMENTS

| JP | 2002-074142 A | 3/2002 |
| JP | 5401261 B2 | 1/2014 |

(Continued)

OTHER PUBLICATIONS

Bartz, Kevin, Vijay Murthi, and Shaji Sebastian. "Logistic regression and collaborative filtering for sponsored search term recommendation." Second workshop on sponsored search auctions. vol. 5. 2006. (Year: 2006).*

(Continued)

*Primary Examiner* — Christopher B Seibert
(74) *Attorney, Agent, or Firm* — Oliff PLC

(57) ABSTRACT

A non-transitory recording medium stores a program causing a computer to execute a process including: determining a recommendation index that indicates a recommendation degree for each product based on a relationship between a number of purchase and a number of purchaser for each product in a sales history of products; and recommending a product in a case where the recommendation index determined for the product satisfies a predetermined condition.

10 Claims, 12 Drawing Sheets

(56) References Cited

U.S. PATENT DOCUMENTS

| | | | | |
|---|---|---|---|---|
| 2010/0086192 A1* | 4/2010 | Grigsby | ................. | G06F 16/58 |
| | | | | 382/141 |
| 2010/0088148 A1* | 4/2010 | Presswala | .......... | G06Q 30/0207 |
| | | | | 705/7.29 |
| 2011/0302032 A1* | 12/2011 | Ishii | ................... | G06Q 30/0255 |
| | | | | 705/14.53 |
| 2015/0006224 A1* | 1/2015 | Arditi | .............. | G06Q 10/06313 |
| | | | | 705/7.23 |
| 2017/0337613 A1* | 11/2017 | Sonoda | ................... | G06F 3/167 |

FOREIGN PATENT DOCUMENTS

| | | |
|---|---|---|
| JP | 2015-130143 A | 7/2015 |
| JP | 2015-201090 A | 11/2015 |

OTHER PUBLICATIONS

Apr. 28, 2017 European Search Report issued in European Patent Office Application No. 16202965.6.
"Printer (computing)"; Wikipedia pp. 1-12 obtained Apr. 19, 2017.
"Image scanner"; Wikipedia pp. 1-14 obtained Apr. 29, 2016.
Mar. 19, 2020 Office Action issued in Japanese Patent Application No. 2016-102236.

\* cited by examiner

FIG. 6

| DATE OF PURCHASE | CONSUMER CODE | PRODUCT NAME | LARGE CLASSIFICATION CODE | MIDDLE CLASSIFICATION CODE | SMALL CLASSIFICATION CODE | PRODUCT CODE | NUMBER OF PURCHASES |
|---|---|---|---|---|---|---|---|
| JANUARY 21, 2016 | 1234567 | NON-HOMOGENIZED MILK OF COMPANY A | 01 | 01 | 01 | 098765 | 1 |
| JANUARY 21, 2016 | 1234567 | COFFEE MILK OF COMPANY A | 01 | 02 | 01 | 533946 | 1 |
| JANUARY 21, 2016 | 7357542 | SOFT TOFU OF COMPANY B | 11 | 04 | 02 | 487390 | 2 |

FIG. 8

| DATE OF LAUNCH | PRODUCT NAME | LARGE CLASSIFICATION CODE | MIDDLE CLASSIFICATION CODE | SMALL CLASSIFICATION CODE | PRODUCT CODE | RECOMMENDATION INDEX |
|---|---|---|---|---|---|---|
| JANUARY 1, 2016 | NON-HOMOGENIZED MILK OF COMPANY A | 01 | 01 | 01 | 098765 | 1.23 |
| JANUARY 1, 2016 | COFFEE MILK OF COMPANY A | 01 | 02 | 01 | 533946 | 1.58 |
| JANUARY 1, 2016 | SOFT TOFU OF COMPANY B | 11 | 04 | 02 | 487390 | 2.98 |

FIG. 9

| PRODUCT NAME | LARGE CLASSIFICATION CODE | MIDDLE CLASSIFICATION CODE | SMALL CLASSIFICATION CODE | PRODUCT CODE | RECOMMENDATION INDEX |
|---|---|---|---|---|---|
| YOGHURT OF COMPANY C | 01 | 03 | 01 | 023182 | 5.10 |
| FROZEN HAMBURGER OF COMPANY D | 21 | 01 | 01 | 114396 | 5.00 |

# RECORDING MEDIUM, PRODUCT RECOMMENDATION SYSTEM, AND PRODUCT RECOMMENDATION METHOD

CROSS-REFERENCE TO RELATED APPLICATIONS

This application is based on and claims priority under USC 119 from Japanese Patent Application No. 2016-102236, filed on May 23, 2016.

BACKGROUND

Technical Field

The present invention relates to a recording medium, a product recommendation system, and a product recommendation method.

SUMMARY

According to an aspect of the invention, there is provided a non-transitory recording medium storing a program causing a computer to execute a process including: determining a recommendation index that indicates a recommendation degree for each product based on a relationship between a number of purchase and a number of purchaser for each product in a sales history of products; and recommending a product in a case where the recommendation index determined for the product satisfies a predetermined condition.

BRIEF DESCRIPTION OF THE DRAWINGS

Exemplary embodiment(s) of the present invention will be described in detail based on the following figures, wherein:

FIG. 6 is a table illustrating an example of a sales history;

FIG. 8 is a table illustrating an example of a sales product list;

FIG. 9 is a table illustrating an example of a recommendation product list;

DETAILED DESCRIPTION

Hereinafter, exemplary embodiments of the invention will be described in detail with reference to the accompanying drawings.

First Exemplary Embodiment

<Example of Hardware Configuration of Product Recommendation Device>

Figure 1:
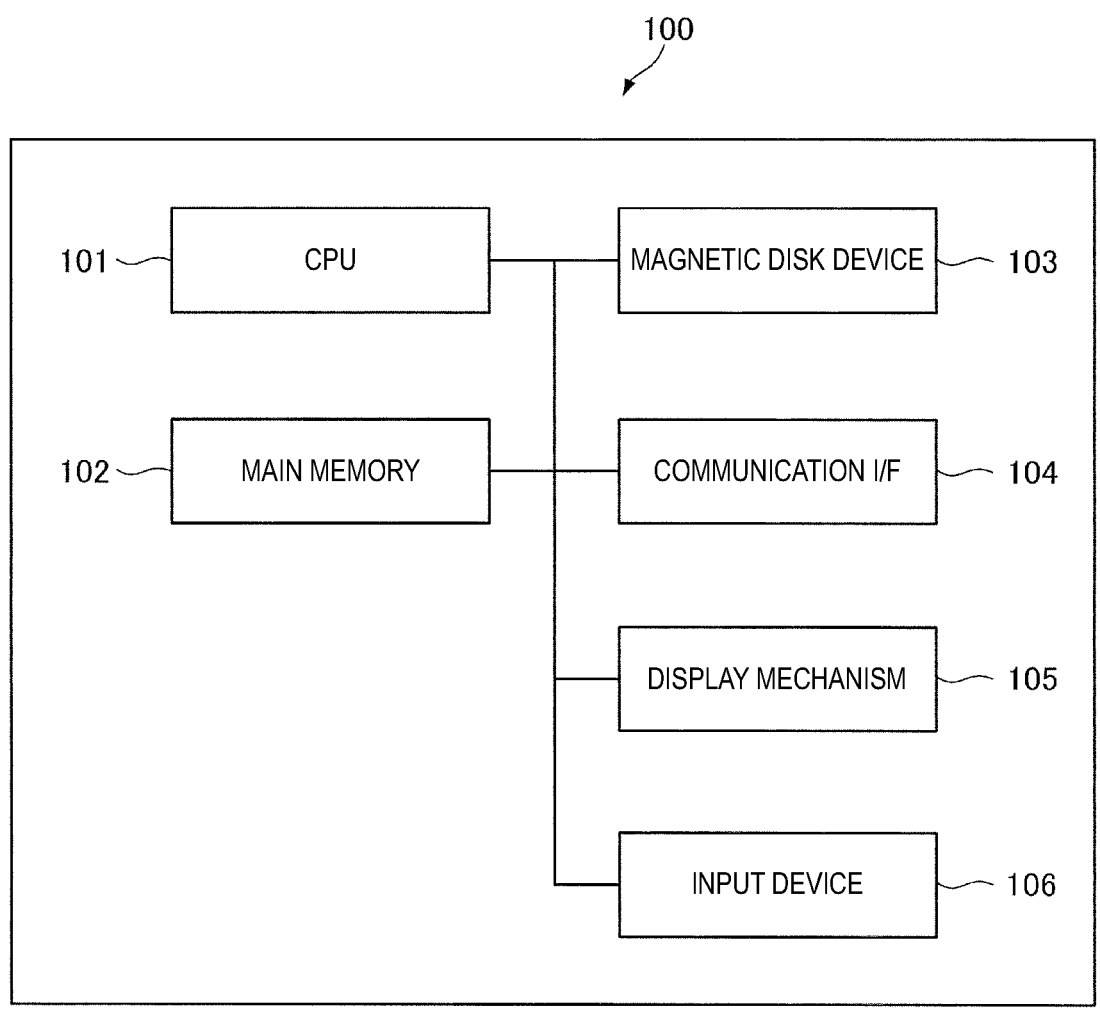
FIG. 1 is a diagram illustrating an example of a hardware configuration of a product recommendation device according to an exemplary embodiment.

First, a hardware configuration of a product recommendation device 100 according to an exemplary embodiment will be described. FIG. 1 is a diagram illustrating an example of the hardware configuration of the product recommendation device 100 according to the exemplary embodiment.

The product recommendation device 100 according to the exemplary embodiment is an example of a product recommendation system, and is, for example, a computer apparatus which is used to recommend a product to consumers in a retail trade or the like·

As illustrated in the drawing, the product recommendation device 100 includes a Central Processing Unit (CPU) 101 which is an arithmetic operation unit, a main memory 102 which is a storage unit, and a magnetic disk device 103.

Here, the CPU 101 executes various programs, such as an Operating System (OS) and an application program, and realizes various functions of the product recommendation device 100. In addition, the main memory 102 is a storage area which stores the various programs, data used for the execution of the programs, and the like. In addition, the magnetic disk device 103 is a storage area which stores input data for the various programs, output data from the various programs, and the like.

Furthermore, the product recommendation device 100 includes a communication interface (communication I/F) 104 which performs communication with the outside, a display mechanism 105 which includes a video memory, a display, and the like, and an input device 106 such as a keyboard, a mouse, or the like.

<Functional Configuration of Product Recommendation Device>

Figure 2:
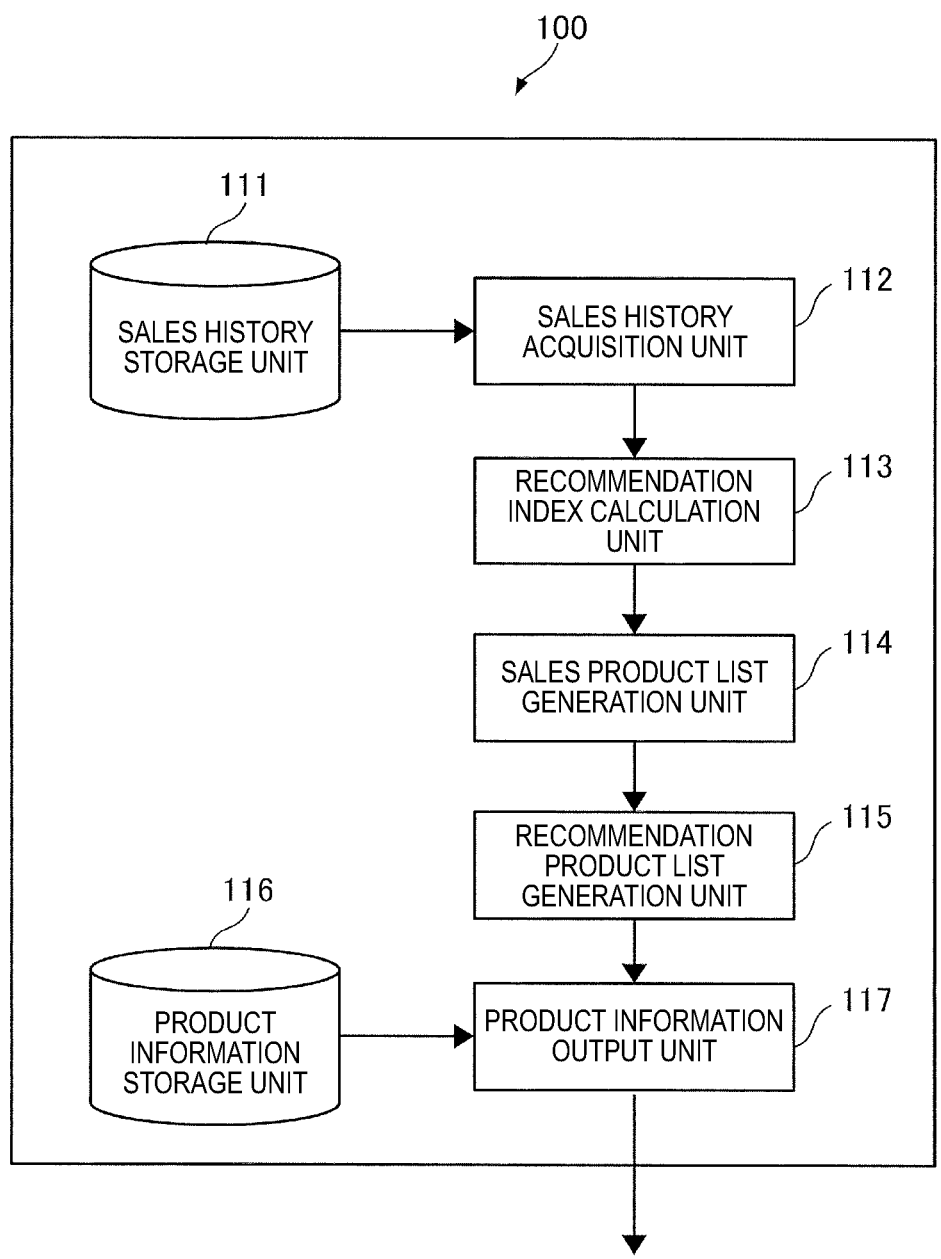
FIG. 2 is a block diagram illustrating an example of a functional configuration of the product recommendation device according to the exemplary embodiment.

Subsequently, a functional configuration of the product recommendation device 100 according to the exemplary embodiment will be described. FIG. 2 is a block diagram illustrating an example of a functional configuration of the product recommendation device 100 according to the exemplary embodiment.

The product recommendation device 100 includes a sales history storage unit 111 which stores a sales history of a product, a sales history acquisition unit 112 which acquires the sales history of the product, and a recommendation index calculation unit 113 which calculates an index (hereinafter, referred to as a recommendation index) indicative of a degree of recommending the product for each product using the sales history of the product.

In addition, the product recommendation device 100 includes a sales product list generation unit 114 which generates a list (hereinafter, referred to as a sales product list) in which a product recommendation index is shown as a list, a recommendation product list generation unit 115 which generates a list (hereinafter, referred to as a recommendation product list) of a product which is recommended to the consumers based on the recommendation index which is shown in the sales product list, a product information storage unit 116 which stores various pieces of information relevant to the product, and a product information output unit 117 which outputs the pieces of information of the product which are shown in the recommendation product list based on the pieces of information stored in the product information storage unit 116.

The sales history storage unit 111 stores the sales history of the product. The sales history indicates a sales record related to each of plural products which are sold in the past, and includes, for example, pieces of information of the number of products which are purchased by consumers and the number of consumers who purchased the products. More specifically; for example, it is possible to exemplify a sales record relevant to various products, such as food and daily necessities, for a retail trader who sells products at a storefront of a supermarket or performs mail-order selling on the Internet. Meanwhile, although the sales history may be relevant to one store, the sales history may expresses records of products which are sold at plural stores and plural different companies.

The sales history acquisition unit 112 acquires sales history of a product from the sales history storage unit 111. Here, although the sales history acquisition unit 112 may acquire the whole sales history stored in the sales history storage unit 111, for example, the sales history acquisition unit 112 may acquire the sales history after designating a period such as sales history of the past one year, sales history of one month corresponding to April of the last year. In a case where the sales history is acquired by designating a period, it is assumed that, for example, the period is set in advance or the period is set through input performed by a user of the product recommendation device 100.

The recommendation index calculation unit 113 as an example of an output unit calculates the recommendation index for each product based on the sales history acquired by the sales history acquisition unit 112. The details of the recommendation index will be described later.

The sales product list generation unit 114 generates the sales product list using the sales history acquired by the sales history acquisition unit 112 and the recommendation index calculated by the recommendation index calculation unit 113. In the sales product list, various pieces of information, which includes the recommendation index, with regard to each product which is included in the sales history acquired by the sales history acquisition unit 112 are shown. The details of the sales product list will be described later.

The recommendation product list generation unit 115 as an example of a recommendation unit generates the recommendation product list based on the recommendation index shown in the sales product list. Here, the recommendation product list generation unit 115 compares each of the product recommendation indexes, and extracts products, which have the recommendation index that satisfies a predetermined condition, as products to be recommended to the consumers. Furthermore, the recommendation product list generation unit 115 generates the recommendation product list by making the extracted products be a list. For example, it is possible to exemplify a fixed number of products in order from the recommendation index that is large as the products which have the recommendation index that satisfies the predetermined condition. In addition, for example, it is possible to exemplify products which has the recommendation index that is equal to or higher than a predetermined threshold.

In addition, the user or the like of the product recommendation device 100 may recognizes the recommendation index shown in the sales product list, and may select a product which will be recommended to the consumers. In this case, the recommendation product list generation unit 115 extracts the product, which is selected by the user of the product recommendation device 100, as a product which has the recommendation index that satisfies the predetermined condition, and generates the recommendation product list.

A procedure of extracting the product which will be recommended to be consumers and the recommendation product list will be described in detail later.

The product information storage unit 116 stores various pieces of information relevant to a product. More specifically, the product information storage unit 116 stores, for example, pieces of information, such as a product name, product explanation, a product price, and a product image for each product with regard to a product which is sold in the past, a product which is scheduled to be sold in the future. In addition, the product information storage unit 116 may store pieces of information such as a product code, a large classification code, a middle classification code, and a small classification code which will be described later, for each product.

The product information output unit 117 as an example of the recommendation unit outputs the pieces of information of the product which are shown in the recommendation product list. Here, the product information output unit 117 acquires the pieces of information, which are stored in the product information storage unit 116, with regard to the product shown in the recommendation product list. Furthermore, the product information output unit 117 displays the pieces of information of the product, which are acquired from the product information storage unit 116, on, for example, a display or the like, which is installed at the storefront. In addition, the product information output unit 117 reveals the acquired pieces of information of the product on a World Wide Web (Web) site of a company through, for example, a network which is not illustrated in the drawing, or transmits the acquired product information to terminal devices or the like of consumers. As described above, in a case where the pieces of information of the product are displayed on the display or the like, is revealed on the Web site, or is transmitted to the terminal devices of the consumers, the product is recommended to the consumers.

Meanwhile, each of the functional units which form the product recommendation device 100, which is illustrated in FIG. 2 is realized in such a way that software and hardware resources work together. Specifically, the functional units are realized in such a way that the CPU 101 reads a program, which realizes the sales history acquisition unit 112, the recommendation index calculation unit 113, the sales product list generation unit 114, the recommendation product list generation unit 115, the product information output unit 117, and the like, from, for example, the magnetic disk device 103, and executes the program in the main memory 102. In addition, the sales history storage unit 111 and the product information storage unit 116 are realized by, for example, the magnetic disk device 103.

<Description of Recommendation Index>

Subsequently, the recommendation index, which is calculated by the recommendation index calculation unit 113, will be described.

In retail trade, such as the supermarket, for example, hot-selling products, such as rice and milk, which are periodically purchased, and products, which are sometimes purchased by a few consumers, exist. It is conceivable that the hot-selling products are products which are purchased by the consumers even though the products are not recommended. In addition, it is conceivable that the products, which are sometimes purchased by a few consumers, are in low demand and, even though the products are widely recommended to the consumers, the number of times in which the products are purchased is small. That is, it is not expected that the sales are greatly improved even though the products are recommended to the consumers. Here, in the exemplary embodiment, it is assumed that products, in which, although a large number of consumers considers as the target of purchase, the total number of purchases is small compared to the hot-selling products, such as rice and milk, are products which should be recommended to the consumers.

Figure 3:
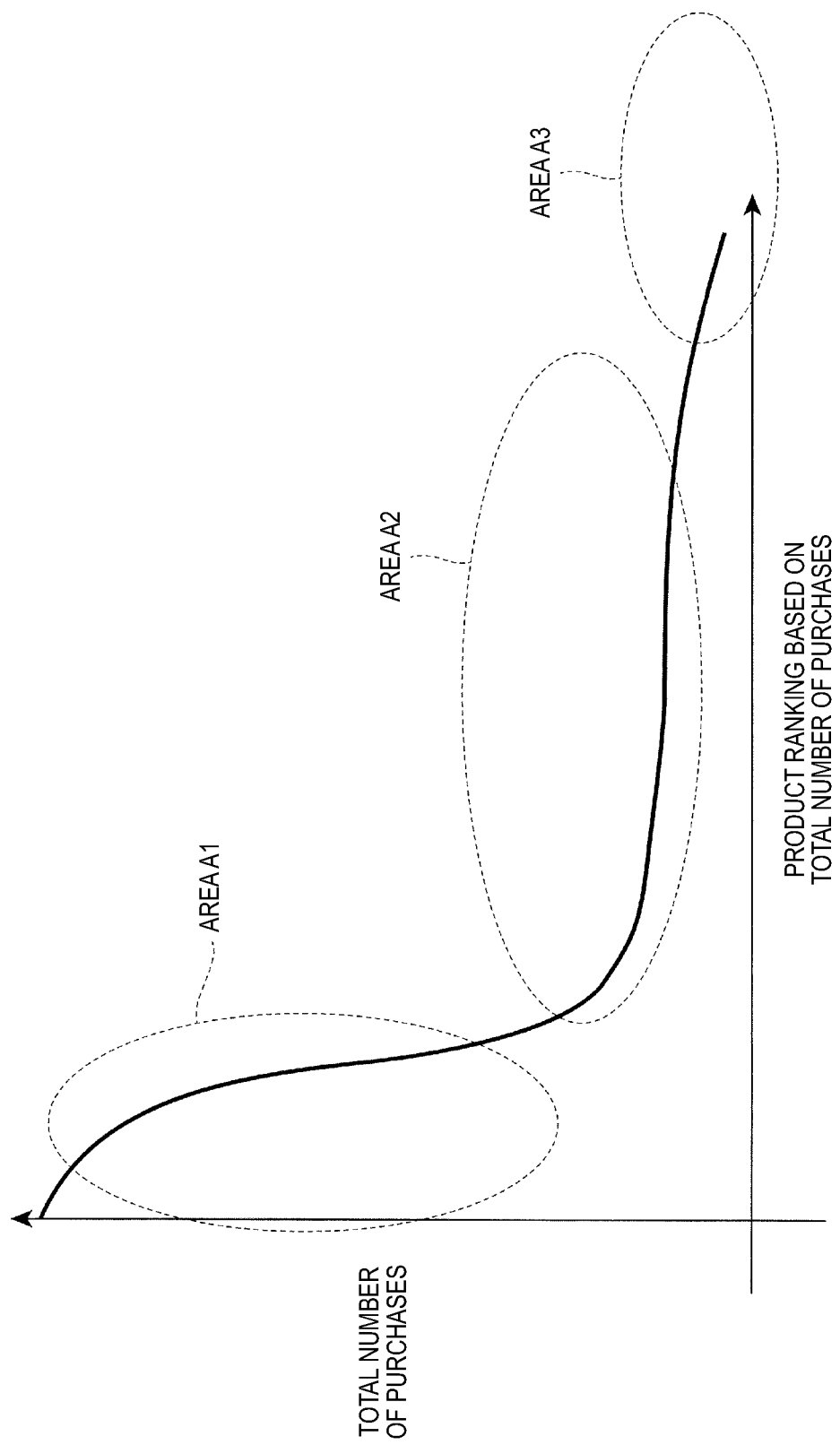
FIG. 3 is a diagram illustrating a recommendation index.
Figure 4:
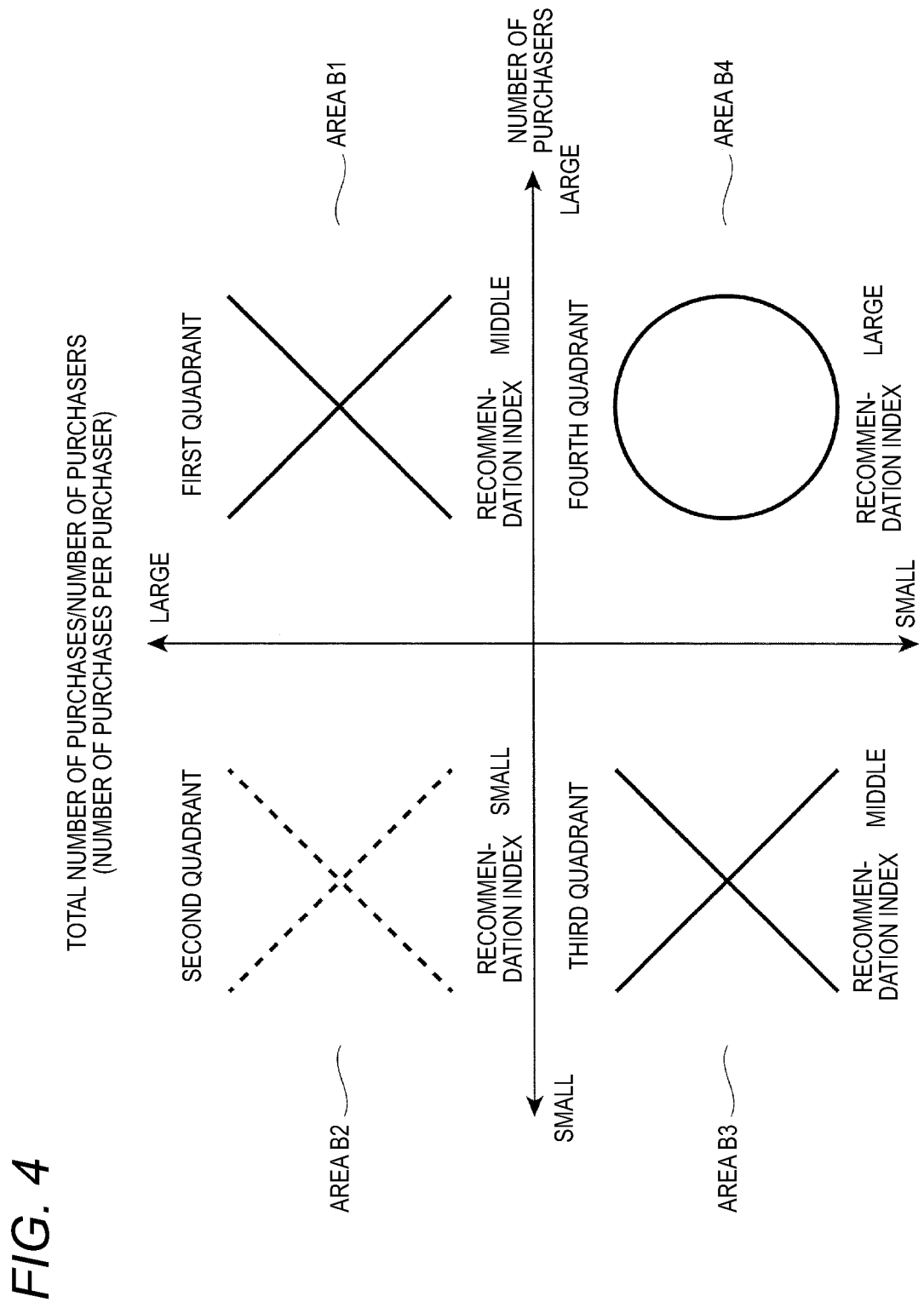
FIG. 4 is a diagram illustrating the recommendation index.

FIGS. 3 and 4 are graphs illustrating the recommendation index.

First, the recommendation index will be described with reference to FIG. 3. In the graph illustrated in FIG. 3, a vertical axis indicates the total number of purchases for a product, that is, the total number of times that each product is purchased by the consumers. In addition, a horizontal axis indicates a product ranking based on the total number of purchases, that is, products are arranged from the left to the right in the drawing in order from a product in which the total number of purchases is large.

Here, an area A1 indicates an area in which products whose total number of purchases is large exist from among the whole products. For example, the above-described hot-selling products, such as rice and milk, correspond to the area A1. In addition, an area A3 is an area in which products whose total number of purchases is small exist from among the whole products. For example, the above-described products which are sometimes purchased by a few consumers correspond to the area A3. Furthermore, as described above, the products, which exist in the area A1 and the area A3, are not expected that the sales of which are greatly improved even though the products are recommended to the consumers.

In contrast, an area A2 is an area in which products whose total number of purchases is in the intermediate exist from among the whole products. It is conceivable that, for example, in the area A2, products which are the targets of purchase by a large number of people but of which the number of purchases is small compared to the hot-selling products exist. In other words, as described above, products, which should be recommended to consumers in the exemplary embodiment, are included in the area A2. However, it is conceivable that, for example, large-quantity purchasing products which are purchased by specific consumers included in the area A2. There is a low possibility that the large-quantity purchasing products which are purchased by the specific consumers are purchased by consumers other than the specific consumers, and it is not expected that the sales of which are greatly improved even though the products are widely recommended to the consumers. Therefore, it is desired to extract products which should be recommended to the consumers by excluding the large-quantity purchasing products which are purchased by the specific consumers from the products which exist in the area A2.

Furthermore, description will be continued with reference to FIG. 4.

In a graph illustrated in FIG. 4, a vertical axis indicates a value acquired by dividing the total number of purchases for a product by the number of product purchasers, that is, the number of purchases for one purchaser. In addition, a horizontal axis indicates the number of product purchasers. Here, an area B1 corresponding to a first quadrant of a coordinate plane which is divided into four areas is an area to which products, in which both the number of purchases for one purchaser and the number of purchasers are large, belong. In other words, there is a high possibility that the products of the area A1 illustrated in FIG. 3 are included in the area B1. In addition, an area B3 corresponding to a third quadrant is an area to which products, in which both the number of purchases for one purchaser and the number of purchasers are small, belong. In other words, there is a high possibility that the products of the area A3 illustrated in FIG. 3 are included in the area B3. Therefore, in the exemplary embodiment, the products which are included in the area B1 and the area B3 do not always correspond to the products which should be recommended to the consumers.

Furthermore, there is a high possibility that the products of the area A2 illustrated in FIG. 3 are included in any one of an area B2 and an area B4. Here, the area B2 corresponding to a second quadrant is an area to which products, in which the number of purchasers is small but the number of purchases for one purchaser is large, belong. In other words, there is a high possibility that products of the area B2 is the large-quantity purchasing products which are purchased by specific consumers, and the products which are included in the area B2 do not always correspond to the products which should be recommended to the consumers.

The area B4 corresponding to a fourth quadrant is an area to which products, in which the number of purchases for one purchaser is small but the number of purchasers is large, belong. In other words, there is a high possibility that products of the area B4 are products which are the targets of purchase of a large number of consumers but the total number of purchases is small compared to the hot-selling products, and the products of the area B4 always correspond to the products which should be recommended to the consumers in the exemplary embodiment.

Here, in the exemplary embodiment, a value which is acquired from Equation 1 below is used as an index which specifies the products of the area B4.

$$\text{Recommendation index} = \frac{\text{the number of purchasers}}{\text{the total number of purchases}/\text{the number of purchasers}} \quad \text{[Equation 1]}$$
$$= \frac{(\text{the number of purchasers})^2}{\text{the total number of purchases}}$$

As shown in the above-described Equation 1, the recommendation index is calculated by dividing the number of purchasers, which is a value of the horizontal axis of the graph illustrated in FIG. 4 by the number of purchases for one purchaser which is a value of the vertical axis of the graph.

In other words, in the graph illustrated in FIG. 4, there is a high possibility that an area in which the value of the horizontal axis is large and the value of the vertical axis is small, that is, the products of the area B4, has a value of the recommendation index, which is large, compared to the products of other areas B1 to B3. In contrast, there is a high possibility that an area in which the value of the horizontal axis is large and the value of the vertical axis is also large, that is, the products of the area B1, has a value of the recommendation index, which is small, compared to the products of the area B4. In addition, there is a high possibility that an area in which the value of the horizontal axis is small and the value of the vertical axis is also small, that is, the products of the area B3, has a value of the recommendation index, which is small, compared to the products of the area B4. Furthermore, there is a high possibility that an area in which the value of the horizontal axis is small and the value of the vertical axis is large, that is, the products of the area B2, has a value of the recommendation index, which is small, compared to the products of other areas B1, B3, and B4.

As above, the product recommendation device 100 according to the exemplary embodiment specifies products which are included in the area B4 based on a size of the recommendation index, and determines the products which should be recommended to the consumers. In other words, it is possible to understand that the recommendation index is a value which is acquired through the relationship between the number of purchases for a product (the total number of purchases) and the number of purchasers. In addition, it is possible to understand that the recommendation index is an index which is used to recommend products in which the number of purchasers is large but the number of purchases (the total number of purchases) is small.

<Relationship Between Recommendation Index and Increased Number of Purchasers Through Recommendation>

Figure 5:
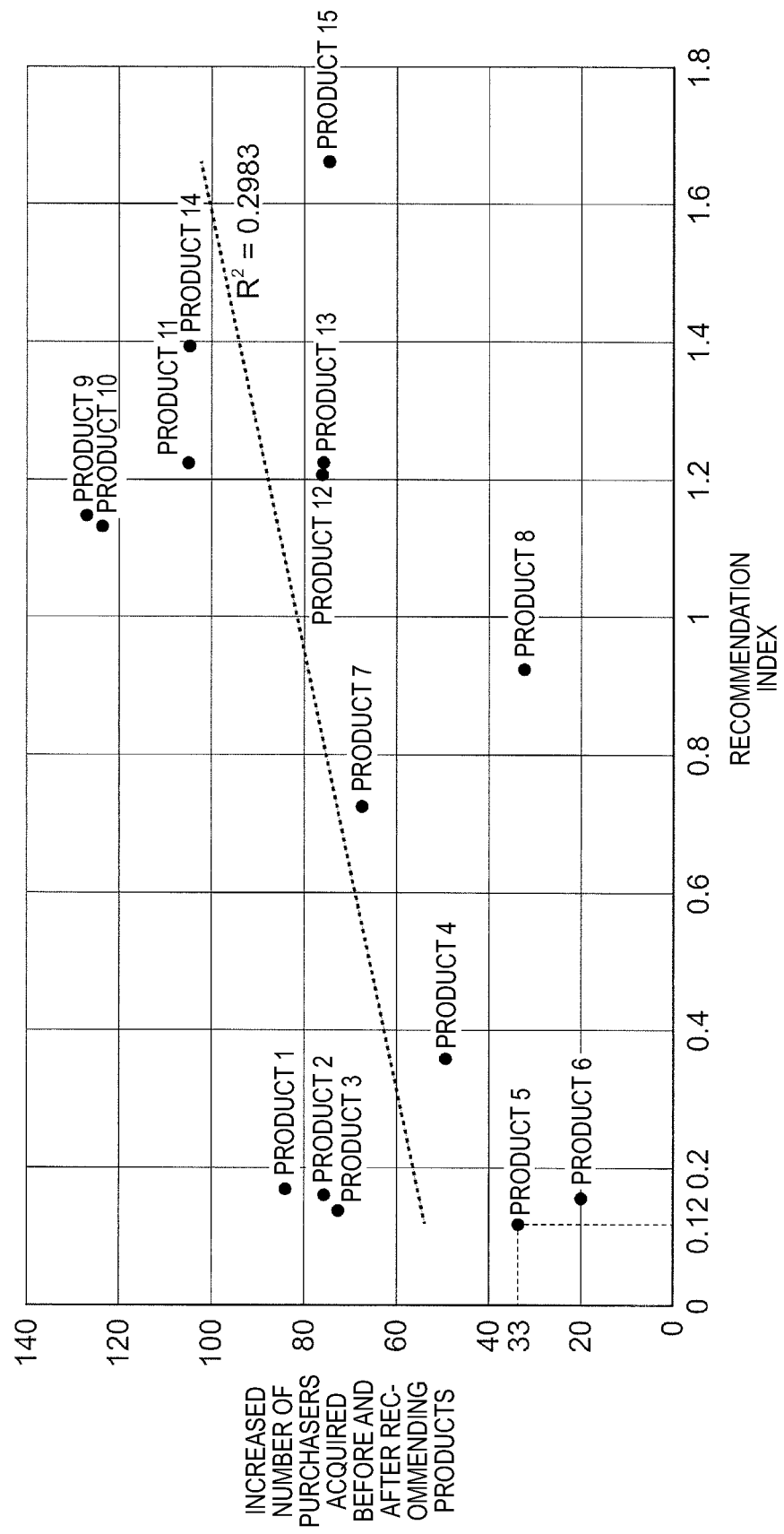
FIG. 5 is a diagram illustrating the relationship between the recommendation index and the increased number of purchasers attributable to recommendation.

Subsequently, the relationship between the recommendation index and the increased number of purchasers through recommendation will be described. FIG. 5 is a graph illustrating the relationship between the recommendation index and the increased number of purchasers through recommendation. In the graph illustrated in FIG. 5, a vertical axis indicates the increased number of purchasers acquired before and after recommending products. In addition, a horizontal axis indicates the recommendation indexes of the products. Here, in an example illustrated in FIG. 5, products are recommended by, for example, actually distributing leaflets or transmitting pieces of information of the product to terminal devices of consumers with approximately 1000 consumers as targets for each of the products (products 1 to 15), and the increased number of purchasers acquired before and after performing recommendation is plotted to each of the products. In addition, FIG. 5 illustrates a regression curve which is acquired through a least-squares method based on a fact that plotting is performed for each of the products.

For example, the product 5 is a product which has the recommendation index that indicates 0.12. In addition, a difference between the number of purchasers acquired before the product 5 is recommended and the number of purchasers acquired after the product 5 is recommended is 33 people, and thus a result that the number of purchasers is increased by 33 people is acquired. The regression curve, which is acquired based on the fact that plotting is performed as above, has inclination in a positive direction. That is, FIG. 5 illustrates that there is a tendency that the increased number of purchasers acquired before and after performing recommendation is large as the recommendation index of the product is large and thus the effect of the recommendation is high. Meanwhile, the square of a relative coefficient R of the regression curve is 0.2983.

<Description of Sales History>

Subsequently, the sales history, which is stored in the sales history storage unit 111, will be described. FIG. 6 is a table illustrating an example of the sales history. In the example illustrated in FIG. 6, a record of sales relevant to three-types of products is shown. The sales history as above is stored in the sales history storage unit 111 in such a way that, for example, a user or the like of the product recommendation device 100 acquires sales history data from the outside. In addition, for example, in a case where a record of sales of each of the products is transmitted from a store using a Point of Sales (POS) system through a network which is not illustrated in the drawing, the sales history may be stored.

Here, a "date of purchase" indicates a date on which a product is purchased. A "consumer code" is a number which is given to a consumer in order to identify a consumer who purchases a product. A "product name" indicates the name of a product. A "large classification code", a "middle classification code", and a "small classification code" are numbers which are given in order to identify classification groups in which classification is performed on the products. The "large classification code" is a code which indicates large classification, the "middle classification code" is a code which indicates middle classification, and the "small classification code" is a code which indicates small classification. The "product code" is a number which is given to a product in order to identify the product. The "number of purchases" indicates the number of purchased products.

In the example illustrated in FIG. 6, from the top, a fact is recorded that products, which have product names of "non-homogenized milk of company A", "coffee milk of company A", and "soft tofu of company B", are purchased. For example, it is recorded that one product, which has a product name of "non-homogenized milk of company A", is purchased by a consumer who has a consumer code of "1234567" in Jan. 21, 2016. In addition, it is recorded that the product has a large classification code of "01", a middle classification code of "01", and a small classification code of "01", and a product code of "098765". Furthermore, a product, which has a product name of "coffee milk of company A", has a consumer code of "1234567", and it may be said that a consumer who purchases a product of the "non-homogenized milk of company A" also purchases a "coffee milk of company A".

Meanwhile, the "consumer code" is given as, for example, information which is necessary for login in a case where the consumer logs in a Web site and purchases a product, or is given to a credit card or the like which is presented in a case where the consumer purchases a product at a storefront. Even in a case where the same consumer purchases products, if it is difficult to specify the same consumer because, for example, purchase is performed without login the Web site or purchase is performed without presenting a credit card at the storefront, different consumer codes are given for respective purchases or the consumer codes are not given.

In addition, even in a case of the same product, there is a case where different numbers are given to the "large classification code", the "middle classification code", the "small classification code", and the "product code" for respective stores and companies which sells the product. In a case where different numbers are given to the same product for the respective stores and companies, it is possible to treat the record of the same product together in the whole stores and whole companies by associating the numbers of the respective stores and companies using, for example, a rearrangement table or the like.

Furthermore, although only the record of the three-types of products is illustrated in the example illustrated in FIG. 6, it is assumed that pieces of information are added to the sales history whenever a product is purchased.

In addition, although not illustrated in FIG. 6, the sales history may include data other than the pieces of information illustrated in FIG. 6. For example, information relevant to consumption such as a product original price, a product selling price, attributes of a consumer such as the sex and age of the consumer, and information used in a case of sale such as a cash register number which is used in a case of selling a product may be included in the sales history.

Figure 7:
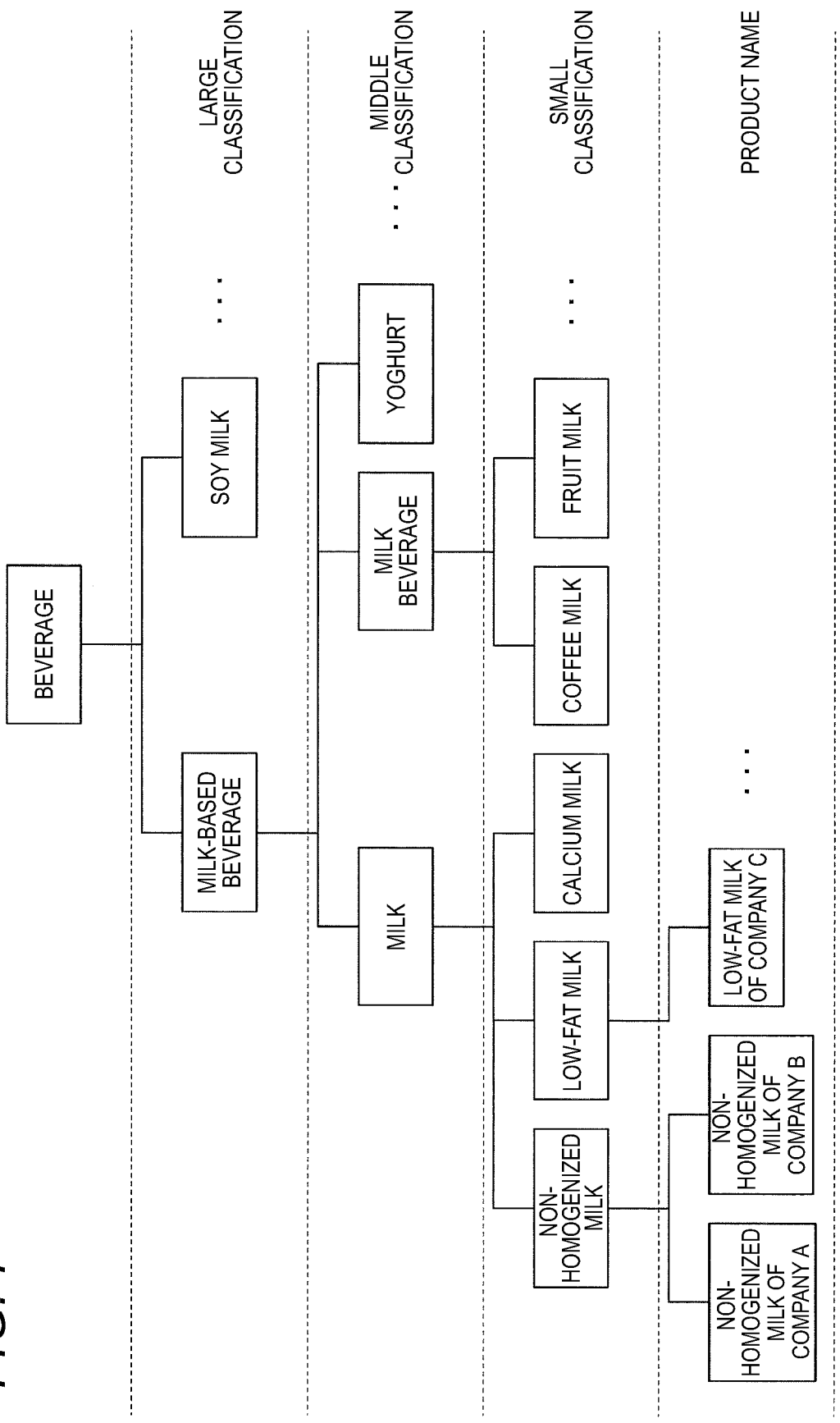
FIG. 7 is a diagram illustrating an example of classification groups of products.

Subsequently, the classification group into which the products are classified will be described in detail. FIG. 7 is a diagram illustrating an example of the classification groups of products. Here, classification groups for "beverage" products will be described.

In the example illustrated in FIG. 7, products are managed in three hierarchies which include the "large classification", the "middle classification", and the "small classification". A "milk-based beverage" and "soy milk" are provided as the large classification. The large classification including the "milk-based beverage" and the "soy milk" is further divided into middle classifications. For example, the "milk-based beverage" is divided into middle classifications including "milk", a "milk beverage", and "yoghurt". Furthermore, the middle classifications including the "milk", the "milk beverage", and the "yoghurt" are further divided into small classifications. For example, the "milk" is divided into small classifications including "non-homogenized milk", "low-fat milk", and "calcium milk". Furthermore, the respective products are classified into any of small classifications. For example, the product which has a product name of "non-homogenized milk of company A" is classified as the small classification of "non-homogenized milk". Meanwhile, the product which has the product name of "non-homogenized milk of company A" is classified as the small classification of "non-homogenized milk", is classified as the "milk" in the middle classification, and is classified as "milk-based beverage" in the large classification.

In other words, in the example illustrated in FIG. 7, for example, the large classification codes of the "milk-based beverage" and the "soy milk" are "01" and "02", respectively. In addition, for example, the middle classification codes of the "milk", the "milk beverage" and the "yoghurt", which are middle classification of the "milk-based beverage", are "01", "02", and "03", respectively. Furthermore, for example, the small classification codes of the "non-homogenized milk", the "low-fat milk", and the "calcium milk", which are small classifications of the "milk", are "01", "02", and "03", respectively. In addition, for example, the small classification codes of the "coffee milk" and "fruit milk", which are small classifications of the "milk beverage", are "01" and "02", respectively.

With regard to the classification performed on products, there is a case where common classification is performed even in a case of different stores and companies which perform sale, and there is a case where different classifications are performed for the respective stores and companies. For example, there is a case where a product, which has a product name of "frozen hamburger of the company A", is classified as "frozen food" in a certain store, and, in contrast, is classified as "processed meat goods" instead of the "frozen food" in another store. As above, in the case where the same product is classified into different classification groups for the respective stores and companies, it is possible to treat the record of the same product together in the whole stores and whole companies by associating the same product which belongs to different classification groups using, for example, the rearrangement table or the like.

Meanwhile, in the example illustrated in FIG. 7, the case where the hierarchy of the classification group is divided into the three hierarchies is described. However, the hierarchy of the classification group is not limited to the three hierarchies, and there us a case where the number of hierarchies is smaller than the three hierarchies and the number of hierarchies is larger than the three hierarchies.

<Description of Sales Product List>

Subsequently, the sales product list, which is generated by the sales product list generation unit 114, will be described. FIG. 8 is a table illustrating an example of the sales product list. The example illustrated in FIG. 8 illustrates a record of sales relevant to the three-types of products.

A "date of launch" indicates a date on which the sale of a product starts. Since the "product name", the "large classification code", the "middle classification code", the "small classification code", and the "product code" are the same as items illustrated in FIG. 6, the description thereof will not be repeated here. The "recommendation index" indicates the recommendation index which is calculated by the recommendation index calculation unit 113.

In the example illustrated in FIG. 8, from the top, products which have product names of "non-homogenized milk of company A", a "coffee milk of company A", and "soft tofu of company B" are illustrated. Furthermore, the example illustrated in FIG. 8 indicates that the recommendation indexes of the products which have the product names of the "non-homogenized milk of company A", the "coffee milk of company A", and the "soft tofu of company B" are "1.23", "1.58", and "2.98", respectively. In a case where comparison is performed on the three-types of products, the recommendation index of the "soft tofu of company B" is the highest, and thus the "soft tofu of company B" is a product which should be most recommended to the consumers from among the three-types of products.

Meanwhile, although only pieces of information of the three-types of products are shown in the example illustrated in FIG. 8, pieces of information, which are recorded as the sales history, of each product are actually shown. Therefore, in a case where four or more types of products are purchases, pieces of information of the four or more types of products are shown.

<Description of Recommendation Product List>

Subsequently, the recommendation product list, which is generated by the recommendation product list generation unit 115, will be described. FIG. 9 is a table illustrating an example of the recommendation product list. In the example illustrated in FIG. 9, two types of products are shown as products which will be recommended to the consumers. Since the "product name", the "large classification code", the "middle classification code", the "small classification code", the "product code", and the "recommendation index" are the same as items illustrated in FIG. 6 or 8, the description thereof will not be repeated here.

In the example illustrated in FIG. 9, two types of products which have product names of "yoghurt of company C" and "frozen hamburger of company D" are shown.

Here, the recommendation product list generation unit 115 generates the recommendation product list illustrated in FIG. 9 by extracting two highly-ranking products through the comparison of, for example, the recommendation indexes shown in the sales product list. In other words, the recommendation product list generation unit 115 extracts the "yoghurt of company C" and the "frozen hamburger of company D", which are products corresponding to two highly-ranking recommendation indexes in the sales product list, as products which have recommendation indexes that satisfy predetermined condition, and generates the recommendation product list. Meanwhile, it is assumed that the number of products which are written in the recommendation product list are determined based on, for example, a budget which is necessary for recommendation, a layout of a Web site, and the like.

In addition, in a case where the sales product list is displayed on the display mechanism 105 or the like, the user of the like of the product recommendation device 100 may check the recommendation index of the sales product list and may select the two products including the "yoghurt of company C" and the "frozen hamburger of company D". In this case, the recommendation product list generation unit 115 extracts the "yoghurt of company C" and the frozen hamburger of company D" which are products selected by the user or the like of the product recommendation device 100 as the products which have recommendation indexes that satisfy the predetermined condition, and generates the recommendation product list.

<Process Procedure of Outputting Recommendation Product List from Sales History>

Figure 10:
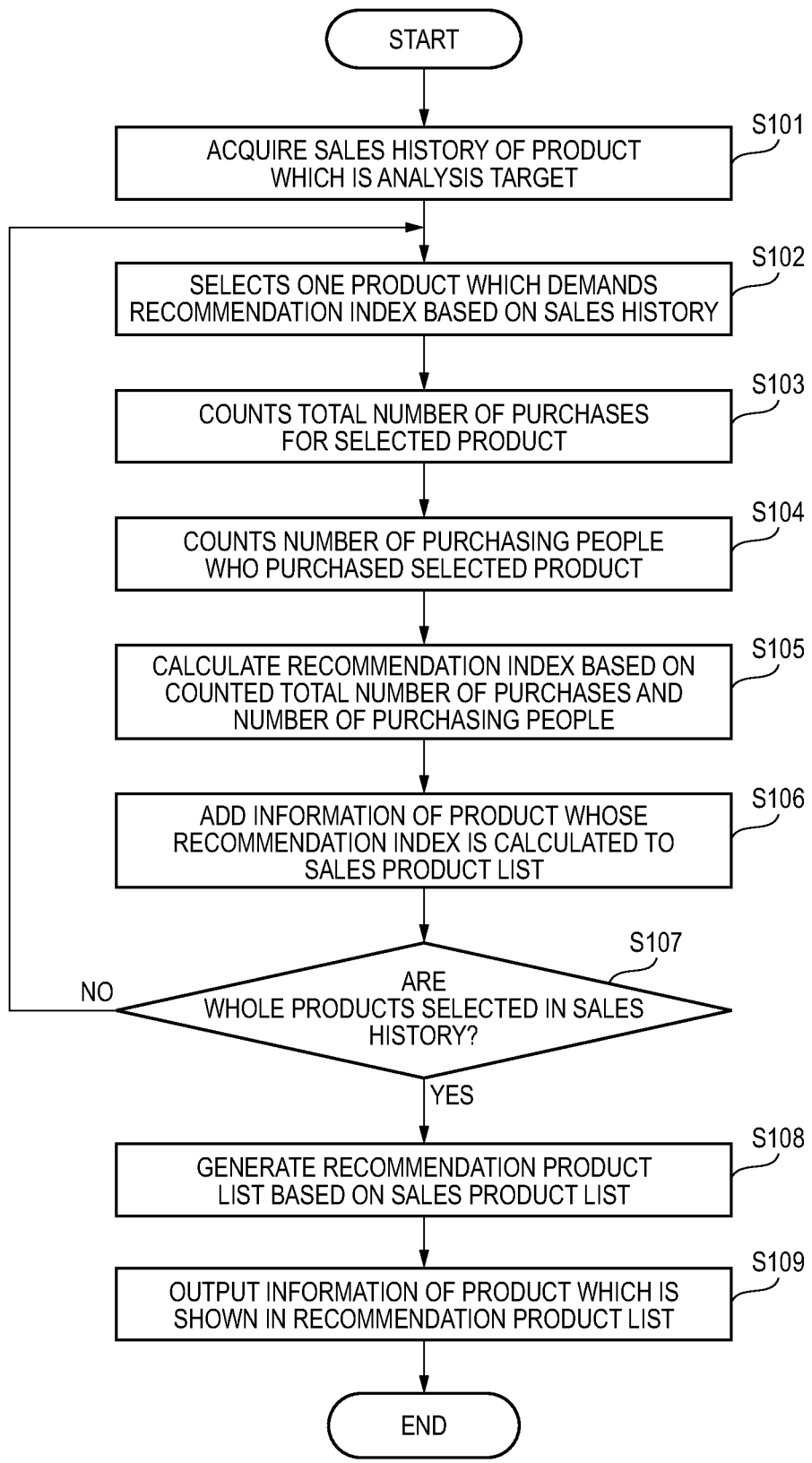
FIG. 10 is a flowchart illustrating an example of a process procedure of outputting the recommendation product list based on the sales history by the product recommendation device.

Subsequently, a process procedure outputting the recommendation product list based on the sales history by the product recommendation device 100 according to the exemplary embodiment. FIG. 10 is a flowchart illustrating an example of the process procedure of outputting the recommendation product list based on the sales history by the product recommendation device 100.

First, the sales history acquisition unit 112 acquires the sales history of a product, which is an analysis target, from the sales history storage unit 111 (step 101). Here, the sales history acquisition unit 112 acquires the sales history while using, for example, a manipulation performed by the user or the like of the product recommendation device 100 as a trigger. In addition, the sales history acquisition unit 112 may acquire the sales history, for example, every fixed period such as one week.

Subsequently, the recommendation index calculation unit 113 selects one product, which demands the recommendation index, based on the sales history which is acquired by the sales history acquisition unit 112 (step 102). Subsequently, the recommendation index calculation unit 113 counts the total number of purchases for the product which is selected from the sales history (step 103). Subsequently, the recommendation index calculation unit 113 counts the number of purchasers who purchased the selected product (step 104), Subsequently, the recommendation index calculation unit 113 calculates a recommendation index for the selected product using the above-described Equation 1 based on the counted total number of purchases and the number of purchasers (step 105).

Here, processes in steps 102 to 105 will be described using a detailed example. In step 102, the recommendation index calculation unit 113 selects, for example, a product which has a product name of "non-homogenized milk of company A" (hereinafter, the product is described as a "product A") from among products which are shown in the sales history which is acquired by the sales history acquisition unit 112. Subsequently, in step 103, the recommendation index calculation unit 113 counts the total number of purchases for the product A based on the sales history which is acquired by the sales history acquisition unit 112, For example, in a case where the sales history corresponds to one month, the recommendation index calculation unit 113 acquires the total sum of the number of products A which are purchased during one month.

Subsequently, in step 104, the recommendation index calculation unit 113 counts the number of purchasers who purchased the product A based on the sales history which is acquired by the sales history acquisition unit 112. For example, in a case where the sales history corresponds to one month, the recommendation index calculation unit 113 acquires the total sum of the number of people who purchases the product A during one month. Meanwhile, the number of purchasers is counted based on the consumer code. For example, in a case where the same consumer code is recorded in the purchase history, the number of purchasers based on the record is one. In addition, in a case where two different consumer codes are recorded, the number of purchasers based on the record is two. Subsequently, in step 105, the recommendation index calculation unit 113 calculates the recommendation index for the product A. For example, in a case where the total number of purchases for the product A is "50" and the number of purchasers for the product A is "10", the recommendation index of the product A is calculated as in Equation 2 below.

$$\text{Recommendation index} = \frac{\text{the number of purchasers}}{\text{the total number of purchases}/\text{the number of purchasers}} \quad \text{[Equation 2]}$$

$$= \frac{10}{50/10}$$

$$= 2$$

In step 105, after the recommendation index is calculated, the sales product list generation unit 114 adds the pieces of information of the product, in which the recommendation index is calculated, to the sales product list (step 106). In the above-described example, the recommendation index of the product A is calculated, and thus the sales product list generation unit 114 adds information of the product A, such as the recommendation index, to the sales product list. Here, in a case where the sales product list is not generated yet, the sales product list generation unit 114 newly generates the sales product list, and adds the information of the product A as a first product to the sales product list. Subsequently, the recommendation index calculation unit 113 determines whether or not the whole products are selected in the sales history which is acquired by the sales history acquisition unit 112 (step 107).

In step 107, in a case where there is a product which is not selected yet (No in step 107), the process proceeds to step 102. In contrast, in a case where the whole products are selected (Yes in step 107), the recommendation product list generation unit 115 generates the recommendation product list based on the sales product list to which the information of each product is added (step 108). Here, the recommendation product list generation unit 115 extracts a product which satisfies a predetermined condition based on the recommendation index of each product shown in the sales product list, and generates the recommendation product list. More specifically, the recommendation product list generation unit 115 generates the recommendation product list by extracting a product which has a highly-ranked recommendation index or a product which is selected by the user or the like of the product recommendation device 100. Subsequently, the product information output unit 117 acquires the pieces of information of the product which are shown in the recommendation product list from the product information storage unit 116, and outputs the acquired information (step 109), Furthermore, the process flow ends.

In addition, in step 102, the recommendation index calculation unit 113 selects one product which has a recommendation index that is calculated based on the sales history.

However, the present invention is not limited to such a configuration. For example, a product which has a recommendation index to be calculated may be determined in advance. In this case, the recommendation index calculation unit 113 checks, for example, the product list in which the recommendation index is calculated, selects one product from the product list, and performs the processes in steps 103 to step 106. In addition, in step 107, the recommendation index calculation unit 113 determines whether or not the whole products are selected in the product list in which the recommendation index is calculated.

<Another Example of Procedure of Calculating Recommendation Index>

Subsequently, another example of a procedure of calculating the recommendation index will be described.

In a case where a certain product (hereinafter, the product is described as a "product B") is sold for a limited time, for example, the amount of recorded data of sales regarding the product B may be small. In the calculation of the recommendation index, the amount of the recorded data of sales is preferably larger than a predetermined reference amount such as the data recorded for more than one month or the likes. Here, the recommendation index calculation unit 113 may estimate the total number of purchases of the product B using the total number of purchases for the product relevant to the product B.

For example, in a case where it is assumed that the product B is sold in one year, the recommendation index calculation unit 113 estimates the total number of purchases for the product B in one year based on Equation 3 below.

In Equation 3, b1 (in one year) is an estimated value of the total number of purchases for the product B in a case where it is assumed that the product B is sold in one year. b1 (for a limited time) is the actual total number of purchases for the product B in a period in which the product B is sold. In addition, B1 (in one year) is the actual total number of purchases for a product, which is classified into a classification group (for example, large classification) to which the product B belongs, in one year. B1 (for a limited time) is the actual total number of purchases for a product, which is classified into the classification group to which the product B belongs, during the period when the product B is sold.

$$b1(\text{in one year}) = B1(\text{in one year}) \times \frac{b1(\text{for a limited time})}{B1(\text{for a limited time})} \quad [\text{Equation 3}]$$

In other words, B1 (in one year) and B1 (for a limited time) include not only the total number of purchases of the product B but the total number of purchases of another product that is classified into the classification group to which the product B belongs. In addition, although b1 (in one year) is an estimated value, b1 (for a limited time), B1 (in one year), and B1 (for a limited time) are values which are acquired based on the sales history of the sales history storage unit 111.

The recommendation index calculation unit 113 estimates the total number of purchases of the product B in one year as above, and calculates the recommendation index of the product B using Equation 1. Meanwhile, as the number of purchasers for the product B in one year, the number of purchasers in one year for a product that is classified into the classification group to which the product B belongs may be used without change. Alternatively, the number of purchasers for the product B in one year may be estimated through calculation similar to Equation 3.

In addition, the estimation of the number of purchases for the product B is not limited to a configuration in which calculation is performed using Equation 3, and, for example, the total number of purchases for the product, which is classified into the classification group (for example, large classification) to which the product B belongs, may be estimated as the total number of purchases for the product B without change. In this case, the recommendation index calculation unit 113 calculates a recommendation index corresponding to the large classification, to which the product B belongs, using, for example, the total number of purchases for the product, which is classified into the large classification to which the product B belongs, and the number of purchasers for the product. Furthermore, the calculated recommendation index is estimated as the recommendation index of the product B. In other words, the recommendation index calculation unit 113 estimates the recommendation index corresponding to large classification, to which the product B belongs, as the recommendation index of the product B without change. Meanwhile, a recommendation index corresponding to middle classification, to which the product B belongs, and a recommendation index corresponding to small classification, to which the product B belongs, may be calculated and estimated as the recommendation index of the product B.

Furthermore, as another example of calculating the recommendation index of the product B, for example, a recommendation index of another product, which is classified into a classification group (for example, large classification) to which the product B belongs, may be used as the recommendation index of the product B without change. In this case, the recommendation index calculation unit 113 estimates, for example, the recommendation index of another product, which is classified into large classification to which the product B belongs, as the recommendation index of the product B without change. In addition, the recommendation index calculation unit 113 may estimate, for example, a recommendation index of another product, which is classified into middle classification to which the product B belongs, and a recommendation index of another product, which is classified into small classification to which the product B belongs, as the recommendation index of the product B.

In addition, although the recommendation index of the product B is not calculated as above, the product B may be recommended in a case where the recommendation index of another product, in which the classification group is common to the product B, satisfies a predetermined condition. That is, in a case where the recommendation index of one product satisfies a predetermined condition, another product which is classified into the classification group to which the one product belongs may be recommended.

Furthermore, for example, a list of sales possible products (hereinafter, referred to as a sales possible list) is prepared in advance, and the product information output unit 117 recommends a product in a case where a product (for example, the product name, the product code, and the like), which has a highly-ranked (for example, most significant) recommendation index, coincides with the product (for example, the product name, the product code, and the like) of the sales possible list. In contrast, in a case where there is not a coincident product in the sales possible list, the product information output unit 117 recommends another product, in which the small classification of the product which has the highly-ranked recommendation index coincides with the small classification of a product in the sales possible list, in the sales possible list as an alternative item of the product which has the highly-ranked recommendation index. Furthermore, in a case where there is not another product, in which the small classification coincides, in the sales possible list, the product information output unit 117 may recommend a product which is selected from among plural of products in which middle classification (or large classification) coincides with that of the product which has the highly-ranked recommendation index, as an alternative item. In this case, for example, the similarity degrees between the small classifications may be set in advance, and an alternative item may be selected which is classified into small classification that has a high similarity degree with the small classification of the product which has the highly-ranked recommendation index. Otherwise, a priority may be set to each small classification, and the alternative item may be selected according to an order of the priority.

If a product which will be recommended is selected by the above-described process, even in a case where, for example, a product which is included in the sales history and has a high recommendation index is not included in the sales possible list, a product is recommended as an alternative item in a case where the same type product is included in the sales possible list. For example, in a case where the treatment of a product, which is included in the sales history and has a high recommendation index, stops in a certain store and the product is replaced by another same type product, sales history for another product does not exist. Even in the case, another product is recommended. Specifically, for example, in a case where the sales of the non-homogenized milk of company A, which has been sole until then and has a high recommendation index, stops in a certain store and non-homogenized milk of company Z and low-fat milk of company Z are started to be newly treated, the products are recommended even though sales history of the new products does not exist (or less).

As above, it is possible to understand the process of recommending another product, which is classified into a classification group of one product in a case where a recommendation index of the one product satisfies the predetermined condition, as an example of the processes in steps 108 and 109 illustrated in FIG. 10.

Meanwhile, in one store and another store, a product in another store may be recommended using a recommendation index that is calculated based on sales history in the one store. For example, a product, which has the highly-ranked (for example, most significant) recommendation index that is calculated based on the sales history in the one store, may be recommended in another store. As above, in a case where the product is not included in the sales possible list of another store, a product, which is the same type product as the product and is included in the sales possible list, may be recommended.

In addition, in the exemplary embodiment, the recommendation index calculation unit 113 calculates a value, which is acquired by dividing the number of purchasers by the number of purchases for one purchaser, as the recommendation index. However, the present invention is not limited to a configuration in which the value is used as the recommendation index. In the exemplary embodiment, recommendation may be performed using products, which are included in the area B4 illustrated in FIG. 4, as targets. Therefore, for example, products, in which the number of purchasers is equal to or larger than a threshold X and the number of purchases for one purchaser is equal to or smaller than a threshold Y, are assumed as the products which are included in the area B4, and a product which has a larger number of purchasers may be recommended or a product which has a smaller number of purchases for one purchaser may be recommended from among the relevant products. In this case, it is possible to understand the number of purchasers and the number of purchases for one purchaser as an example of the recommendation index.

Furthermore, for example, in order to satisfy a condition in which the number of purchasers is equal to or larger than the threshold X and the number of purchases for one purchaser is equal to or smaller than the threshold V, the number of purchasers is equal to or larger than threshold X and the total number of purchases may be at least equal to or smaller than XY (that is, the product of the threshold X and the threshold. Y). Here, for example, it is assumed that products, in which the number of purchasers is equal to or larger than the threshold X and the total number of purchases is equal to or smaller than XY, are products which are included in the area B4, and a product which has a larger number of purchasers may be recommended or a product which has a smaller total number of purchases may be recommended from among the relevant products.

In this case, it is possible to understand the number of purchasers and the total number of purchases as an example of the recommendation index.

Second Exemplary Embodiment

Subsequently, a second exemplary embodiment will be described.

In the first exemplary embodiment, the recommendation index calculation unit 113 calculates the recommendation index using the number of purchasers and the total number of purchases. In contrast, in the exemplary embodiment, the recommendation index calculation unit 113 calculates the recommendation index using different values.

The hardware configuration and functional configuration of the product recommendation device 100 according to the exemplary embodiment are the same as the configurations illustrated in FIGS. 1 and 2. In addition, the functions of the sales history storage unit 111, the sales history acquisition unit 112, the sales product list generation unit 114, the recommendation product list generation unit 115, the product information storage unit 116, and the product information output unit 117 are the same as in the first exemplary embodiment. Accordingly, hereinafter, the recommendation index calculation unit 113 will be described as a different point from the first exemplary embodiment.

In the first exemplary embodiment, the recommendation index is a value which is acquired by dividing the number of purchasers by the number of purchases for one purchaser. Here, the number of purchasers is the number of people who purchases the product, and it is possible to understand that the number of purchasers is an example of a degree which indicates the existence of consumers who are familiar to the product (hereinafter, referred to as a familiarity degree). In addition, it is possible to understand that the number of purchases for one purchaser is an example of a degree of hot-selling (hereinafter, referred to as a hot-selling degree) which indicates a degree in which the product is sold. That is, it is possible to understand the recommendation index as a value which is calculated through Equation 4 below.

$$\text{Recommendation index} = \frac{\text{familiarity degree}}{\text{hot-selling degree}} \quad \text{[Equation 4]}$$

Furthermore, in addition to the number of purchasers, for example, a frequency in which a product is exposed at the time of sale, such as the number of times in which the product is disposed at the storefront, the number of dates on which the product is disposed at the storefront, and the number of times in which the product is put in a catalog, in other words, the number of times in which the product is exposed at the time of sale may be used as the familiarity degree.

In addition, in addition to the number of purchases for one purchaser, for example, a value which is acquired by dividing the total number of purchases by the number of exposures (that is, the number of purchases for one exposure) may be used as the hot-selling degree.

For example, in a case where the familiarity degree is set to the number of exposures and the hot-selling degree is set to the number of purchases for one exposure, the recommendation index is calculated through Equation below.

$$\text{Recommendation index} = \frac{\text{familiarity degree}}{\text{hot-selling degree}} \quad [\text{Equation 5}]$$
$$= \frac{\text{the number of exposures}}{\text{the total number of purchases}/\text{the number of exposures}}$$
$$= \frac{(\text{the number of exposures})^2}{\text{the total number of purchases}}$$

Figure 11A:
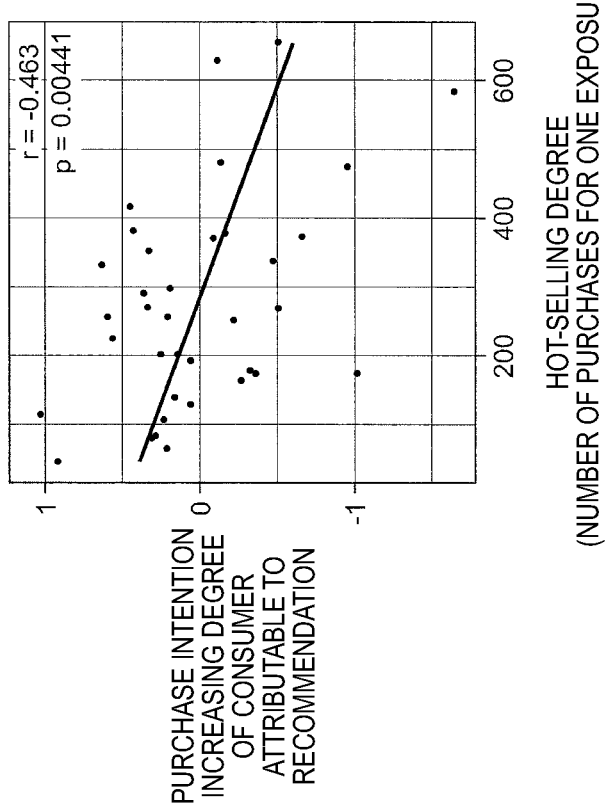
FIG. 11A is a graph illustrating the relationship between a familiarity degree and a purchase intention increasing degree of a consumer.

FIG. 11A is a graph illustrating the relationship between the familiarity degree and the purchase intention increasing degree of the consumer. In addition, FIG. 11B is a graph illustrating the relationship between the hot-selling degree and the purchase intention increasing degree of the consumer.

First, in the graph illustrated in FIG. 11A, a vertical axis indicates the purchase intention increasing degree of the consumer attributable to recommendation. The purchase intention increasing degree indicates an increasing rate of the number of purchases for a product acquired before and after recommendation is performed, and the average of the increasing rates of all products is 0. Actually, the average of the increasing rates of all products is 1.8, and thus actual increasing rate is acquired by adding 1.8 to the value of the vertical axis. In addition, a horizontal axis indicates the number of exposures as an example of the familiarity degree.

Here, in the example illustrated in FIG. 11A, a product is recommended by actually distributing leaflets for each product and transmitting pieces of information of the product to terminal devices of consumers while measuring the number of times in which plural products are exposed at a storefront, and the purchase intention increasing degree, which is acquired before and after the recommendation is performed, is plotted for each product. In addition, FIG. 11A illustrates a regression curve which is acquired through a least-squares method based on a fact that the plotting is performed for each product. As shown in the drawing, the regression curve has positive inclination (inclination r=0.528). That is, it is shown that there is a tendency that the purchase intention increasing degree attributable to recommendation is large as the number of exposures is large. In other words, it is shown that the effect attributable to the recommendation is high as the product is exposed.

Figure 11B:
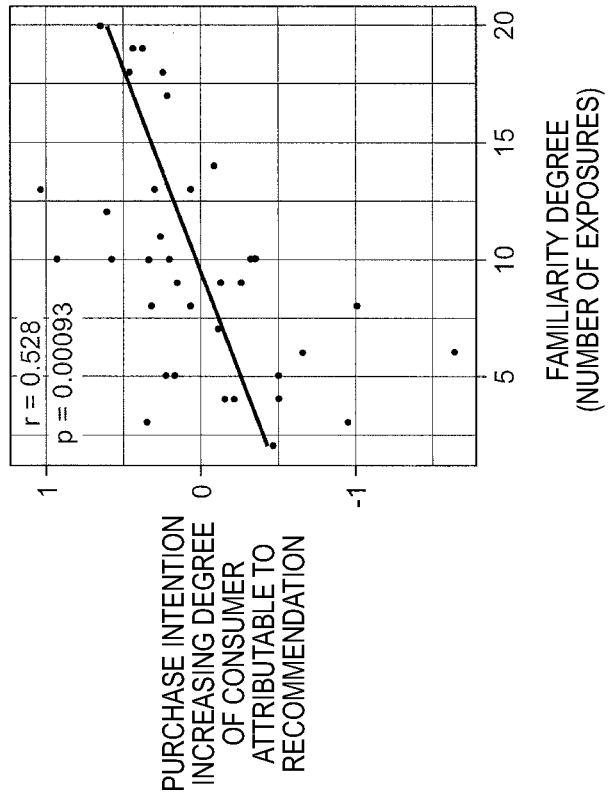
FIG. 11B is a graph illustrating the relationship between a hot-selling degree and the purchase intention increasing degree of the consumer.

In addition, in the graph illustrated in FIG. 11B, a vertical axis indicates the purchase intention increasing degree of the consumer attributable to recommendation. In addition, a horizontal axis indicates the number of purchases for one exposure as an example of the hot-selling degree. Here, similarly to the example illustrated in FIG. 11A, in the example illustrated in FIG. 11B, recommendation is actually performed on each product while measuring the number of times in which plural products are exposed at a storefront, and the purchase intention increasing degree, which is acquired before and after the recommendation is performed, is plotted for each product. In addition, FIG. 11B illustrates a regression curve which is acquired through a least-squares method based on a fact that plotting is performed for each of the products. As illustrated in the drawing, the regression curve has a negative inclination (inclination r=−0.463). That is, it is shown that there is a tendency that the purchase intention increasing degree attributable to recommendation is small as the number of purchases for one exposure is large. In other words, it is shown that a hot-selling product has low effect attributable to recommendation.

Furthermore, according to Equation 5, the recommendation index is large as the number of exposures is large and the number of purchases for one exposure is small. In addition, according to the examples illustrated in FIGS. 11A and 11B, the purchase intention increasing degree is large as the number of exposures is large, and the purchase intention increasing degree is large as the number of purchases for one exposure is small. That is, the purchase intention increasing degree is large as the recommendation index is large. Here, in the exemplary embodiment, the recommendation product list generation unit 115 generates the recommendation product list by extracting a product, in which the recommendation index shown in Equation 5 satisfies the predetermined condition, for example, a fixed number of products in order from a large recommendation index, or a product in which the recommendation index is equal to or larger than the predetermined threshold.

In addition, in the exemplary embodiment, it is possible to understand the familiarity degree as a recognition degree which indicates how much the product is recognized by the consumer. The recognition degree is not limited to the frequency, in which a product is exposed, and the number of exposures. For example, the recognition degree may be acquired by actually performing a questionnaire for asking how much the product is recognized to the consumer.

<Another Example of Hardware Configuration of Product Recommendation Device>

Meanwhile, a process of the product recommendation device 100 according to the first and second exemplary embodiments may be realized in an image forming apparatus which has a printing function. Here, a hardware configuration is described while it is assumed that the process of the product recommendation device 100 is realized in the image forming apparatus.

Figure 12:
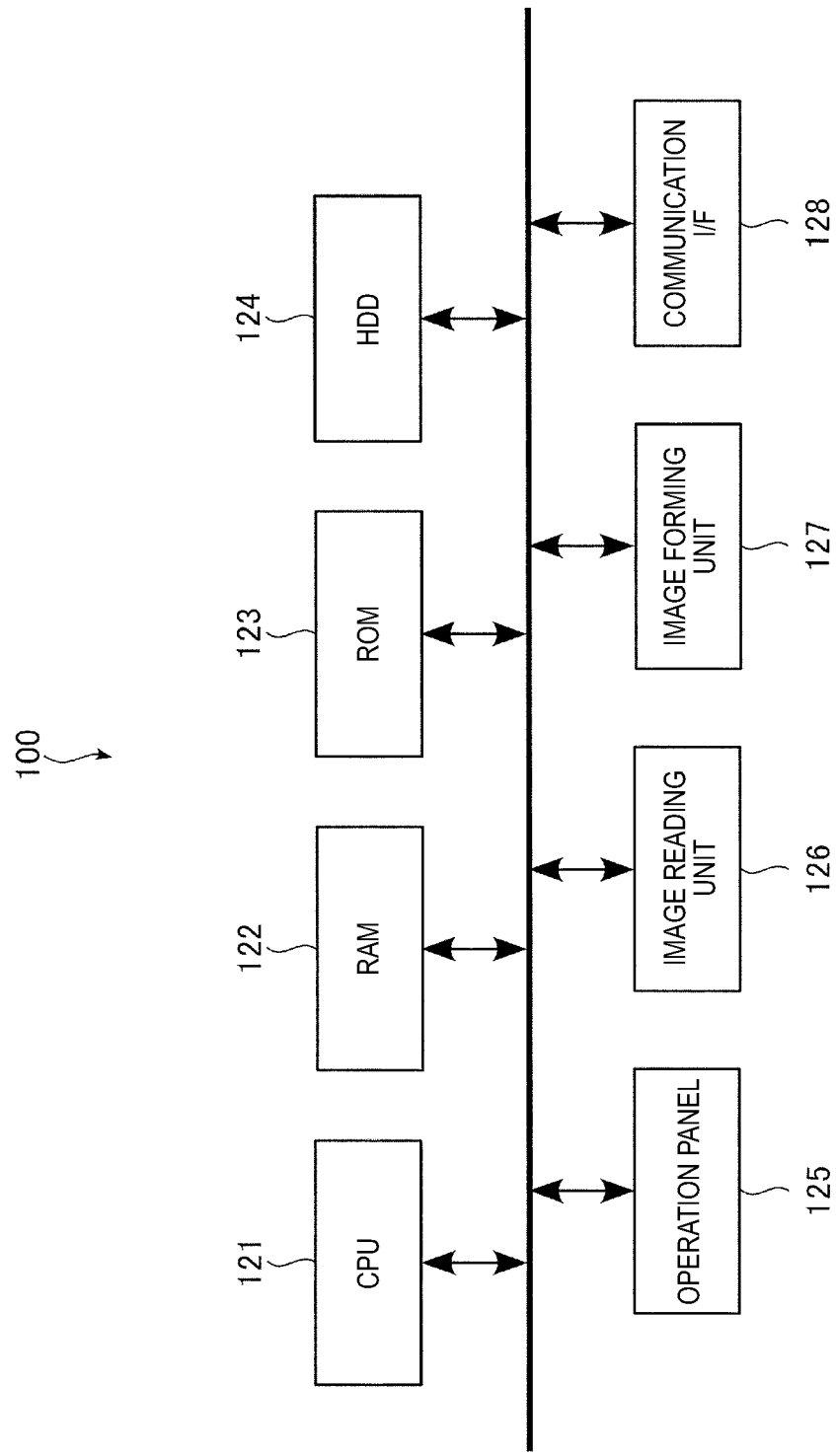
FIG. 12 is a diagram illustrating an example of a hardware configuration of an image forming apparatus to which the exemplary embodiment can be applied.

FIG. 12 is a diagram illustrating an example of a hardware configuration of an image forming apparatus to which the exemplary embodiment can be applied.

As illustrated in the drawing, the product recommendation device 100 includes a Central Processing Unit (CPU) 121, a Random Access Memory (RAM) 122, a Read Only Memory (ROM) 123, a Hard Disk Drive (HDD) 124, an operation panel 125, an image reading unit 126, an image forming unit 127, and a communication interface (communication I/F) 128.

The CPU 121 realizes each of the functional units, which form the product recommendation device 100 illustrated in FIG. 2, by plotting and executing the various programs, which are stored in the ROM 123 and the like, to the RAM 122.

The RAM 122 is a memory which is used as a working memory of the CPU 121.

The ROM 123 is a memory which stores the various programs and the like which are executed by the CPU 121.

The HDD 124 is, for example, a magnetic disk device which stores image data, which is read by the image reading unit 126, image data, which is used to form an image in the image forming unit 127, and the like.

The operation panel 125 is, for example, a touch panel which displays various pieces of information and receives operation input from the user.

The image reading unit 126 reads an image which is recorded on a recording material such as paper. Here, the image reading unit 126 is, for example, a scanner, and may use a Charge Coupled Device (CCD) method of reducing reflection light for light, which is irradiated to an original document from a light source, by lenses and receiving the reflection light using a CCD or a Contact Image Sensor (CIS) method of receiving reflection light for light, which is irradiated to an original document from a LED light source.

The image forming unit 127 is a print mechanism which forms an image on a recording material such as paper.

Here, the image forming unit 127 may be, for example, a printer, and may use an electrophotographic process for forming an image by transferring toner which is attached to a photosensitive body to the recording material or an ink jet method for forming an image by discharging ink on the recording material.

The communication I/F 128 functions as a communication interface which transmits and receives various data to and from another device through a network which is not illustrated in the drawing.

As described above, in a case where the process of the product recommendation device 100 is realized by the image forming apparatus, the product information output unit 117 may form pieces of information (image) relevant to the product, which is shown in the recommendation product list, on the paper and may output the information. In this case, the product information output unit 117 is realized by the image forming unit 127.

Moreover, as the pieces of information relevant to the product, for example, pieces of information including a product name, product explanation, a product price, a product image, and the like are formed on the paper and are output. In a case where the paper on which the pieces of information relevant to the product are formed is directly distributed to, for example, consumers as advertisement, distributed as inserted advertisement for newspaper, or displayed at the storefront, the product is recommended to the consumers. In this case, it is possible to understand the image forming apparatus as an example of the product recommendation system.

In addition, the function of the product recommendation device 100 may be realized by dividing the function into plural devices. For example, the functions of the sales history storage unit 111, the sales history acquisition unit 112, the recommendation index calculation unit 113, the sales product list generation unit 114, and the recommendation product list generation unit 115 may be realized by a computer device illustrated in FIG. 1, and the function of the product information output unit 117 may be realized by the image forming apparatus illustrated in FIG. 12. In this case, it is possible to understand the computer device and the image forming apparatus as an example of the product recommendation system.

Meanwhile, it is possible to provide a program, which realizes the exemplary embodiments of the present invention, by a communication unit, and it is possible to provide the program after storing the program in a non-transitory recording medium such as a CD-ROM.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A non-transitory recording medium storing a program causing a computer to execute a process comprising:
   determining, using a processor configured to operate as a recommendation index calculation unit, a recommendation index that indicates a recommendation degree for each product based on a relationship between a number of purchase and a number of purchaser for each product in a sales history of products;
   recommending, using a processor configured to operate as a product information output unit and/or using an image forming unit having the product information output unit realized thereon, a product in a case where the recommendation index determined for the product satisfies a predetermined condition; and
   transmitting or displaying pieces of information relating to the recommended product to at least one of a display, the website of a company, or a terminal device of a consumer,
   wherein the recommendation index is an index that is used to recommend the product of which the number of purchaser is larger than a predetermined value but of which the number of purchase is smaller than the predetermined value.

2. The non-transitory recording medium program according to claim 1,
   wherein the determining comprises, in a case where each product is classified into any of classification groups, determining the recommendation index for one product based on the number of purchase and the number of purchaser for a product that is classified into a classification group into which the one product is classified.

3. The non-transitory recording medium program according to claim 2,
   wherein the determining comprises, in the case where each product is classified into any of classification groups, determining a recommendation index based on the number of purchase and the number of purchaser for a product that is classified into a classification group into which the one product is classified as the recommendation index for the one product.

4. The non-transitory recording medium program according to claim 1,
   wherein the recommending comprises, in a case where each product is classified into any of classification groups, recommending one product instead of other product, the one product being classified into a classification group into which the other product is classified, a recommendation index of the one product satisfying the predetermined condition.

5. A non-transitory recording medium storing a program causing a computer to execute a process comprising:
   determining, using a processor configured to operate as a recommendation index calculation unit, a recommendation index that indicates a recommendation degree for each product based on a number of purchase of a product and a consumer recognition degree for each product in a sales history of products;
   recommending, using a processor configured to operate as a product information output unit and/or using an image forming unit having the product information output unit realized thereon, a product in a case where the recommendation index determined for the product satisfies a predetermined condition; and
   transmitting or displaying pieces of information relating to the recommended product to at least one of a display, the website of a company, or a terminal device of a consumer.

6. The non-transitory recording medium program according to claim 5,
   wherein the consumer recognition degree of a product is a number of time that the product is exposed for sale.

7. A product recommendation system comprising:
   a processor configured to operate as a recommendation index calculation unit that determines a recommendation index that indicates a recommendation degree for each product based on a relationship between a number of purchase and a number of purchaser for each product in a sales history of products;
   wherein (a) the processor is further configured to operate as a product information output unit and/or (b) an image forming unit has the product information output unit realized thereon, and the product information output unit recommends a product in a case where the recommendation index determined for the product satisfies a predetermined condition, and transmitting or displaying pieces of information relating to the recommended product to at least one of a display, the website of a company, or a terminal device of a consumer,
   wherein the recommendation index is an index that is used to recommend the product of which the number of purchaser is larger than a predetermined value but of which the number of purchase is smaller than a predetermined value.

8. The product recommendation system according to claim 7,
   wherein, in a case where the recommendation index determined for the product satisfies the predetermined condition, the recommendation unit recommends the product by forming an image of the product on a recording material as an output.

9. A product recommendation method comprising:
   determining, using a processor configured to operate as a recommendation index calculation unit, a recommendation index that indicates a recommendation degree for each product based on a relationship between a number of purchase and a number of purchaser for each product in a sales history of products;
   recommending, using a processor configured to operate as a product information output unit and/or using an image forming unit having the product information output unit realized thereon, a product in a case where the recommendation index determined for the product satisfies a predetermined condition; and
   transmitting or displaying pieces of information relating to the recommended product to at least one of a display, the website of a company, or a terminal device of a consumer,
   wherein the recommendation index is an index that is used to recommend the product of which the number of purchaser is larger than a predetermined value but of which the number of purchase is smaller than the predetermined value.

10. The product recommendation method according to claim 9,
    wherein the recommendation index is a value that is determined by dividing the number of purchaser by the number of purchase per purchaser, and
    the recommending includes recommending a product the recommendation index of which is relatively high among the products.

* * * * *